July 5, 1960 J. G. SIMON 2,943,967
REINFORCED PLASTIC SCREW THREADS
Filed June 29, 1956
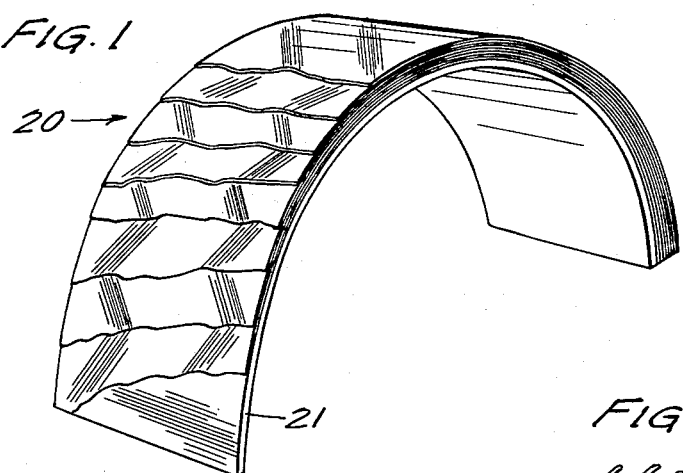
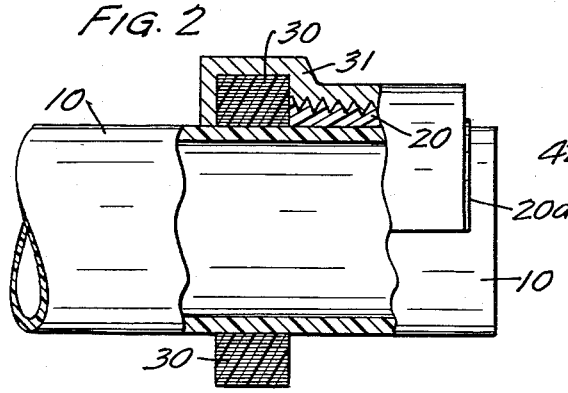
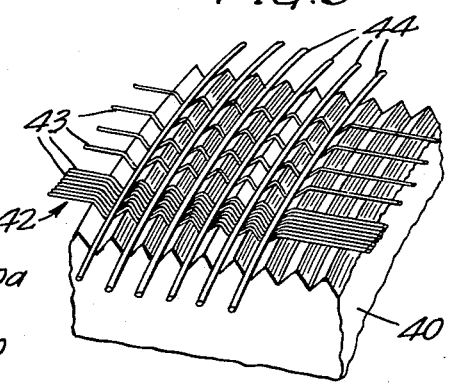
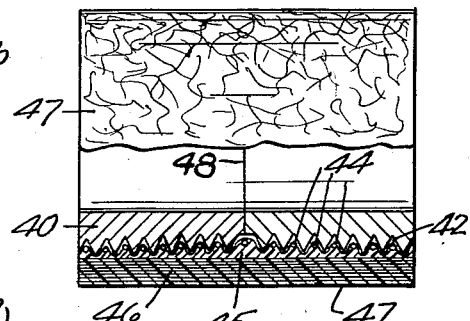
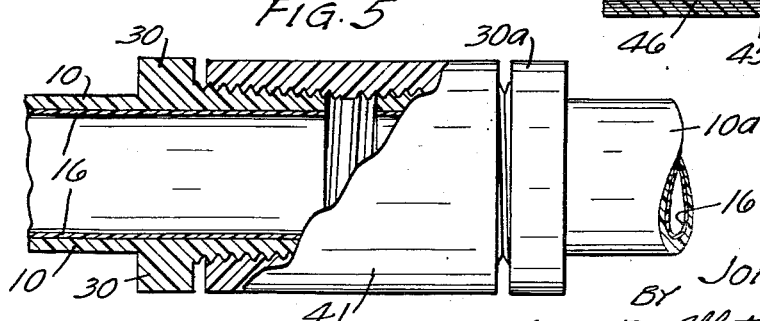
INVENTOR
JOHN G. SIMON
BY
Carpenter, Abbott, Coulter & Kinney
ATTORNEYS

United States Patent Office 2,943,967
Patented July 5, 1960

2,943,967
REINFORCED PLASTIC SCREW THREADS

John G. Simon, St. Paul, Minn., assignor to Minnesota Mining and Manufacturing Company, St. Paul, Minn., a corporation of Delaware Filed June 29, 1956, Ser. No. 594,811

2 Claims. (Cl. 154—83)

This invention relates to filament-reinforced plastic screw threads for plastic pipe and with methods for fabricating fiber-reinforced plastic screw threads. The invention is particularly concerned with screw threads prepared from resin compositions which harden to a substantially infusible, insoluble state and which are reinforced throughout by continuous and essentially contiguous glass fibrous material.

With the comparatively recent advance in the art of fibrous reinforcing of plastic material, it has been recognized that a large market exists for reinforced plastic pipe, particularly in the handling of corrosive fluids for which more common pipe materials such as steel and aluminum are unsuited. However, means heretofore available for coupling sections of the pipe together or into other components of a fluid-handling system are comparatively primitive and lack convenience and durability. By way of example, one technique for providing coupling means for reinforced plastic pipe is to machine screw threads as in the metal-working art, which procedure severs the filaments and makes the strength of the threads depend upon the plastic rather than the relatively stronger filaments. Efforts have also been made to mold screw threads out of reinforced plastic compositions, but to the inventor's knowledge, a homogeneous or even partially homogeneous structure has not heretofore been realized by such procedure unless the filaments are all disposed substantially helically at the pitch of the screw threads, in which event virtually no strength over and above that of the relatively weak plastic material is imparted to the screw threads by the filaments in the most critical direction, that is, in the axial direction.

I have now contrived for plastic pipe members filament-reinforced plastic screw threads of great strength and durability whereby sections of reinforced plastic pipe may be quickly and conveniently connected and disconnected. My invention is applicable to all styles of screw thread and so may be used to provide threads standard in the field of intended use of the plastic pipe, thereby allowing connection into existing fluid-handling installations and to non-plastic pipe. Of great importance is the fact that the novel screw threaded members are susceptible to fast, economical fabrication with standard machinery. Normally, the same materials of which the plastic pipe is fabricated are utilized in making the screw threads.

By the present invention, strong, tough plastic screw threads are obtained by reinforcement throughout the cross-section of the plastic helical rib with continuous stress-absorbing filaments providing reinforcement both in the direction of the axis of the threads and in the rib direction. The novel reinforced plastic screw threads are produced by forming the reinforcing filaments into a flat, compact layer filled with plastic material and drawing the plastic-filled layer into the contour of the die threads under pressure sufficient to cause the plastic-filled layer to flow the pressure being applied progressively from one end of the die to the other. The exposed surface of the thread-forming layer and a pipe member are then adhered together, and the plastic allowed to harden, after which the die is removed. By this technique, both male and female threads may be formed so that plastic pipe sections and pipe fittings may be connected together to provide a complete system of plastic fluid conduit.

The structure of the reinforced plastic screw threads and the procedure by which they may be produced may be best understood with reference to the drawings in which:

Figure 1 is a perspective view in part cut away to show filament disposition of a plastic laminate of continuous non-woven glass filaments, from which laminate male threads may be formed on a plastic pipe using an internally threaded die;

Figure 2 is an elevation, partly broken away to a central section and partly exploded, illustrating diagrammatically the application of a wrench ring and upset male threads to a pipe with an internally threaded die;

Figure 3 is an enlarged fragmentary perspective view illustrating a basic step in the fabrication of a female thread for a pipe coupling around an externally-threaded metal die;

Figure 4 is a side elevation, partly broken away to a central section, showing a complete threaded female coupling prior to removal of the die; and Figure 5 shows the connection of two sections of externally threaded pipe as illustrated in Figure 2 by means of the threaded female coupling illustrated in Figure 4.

Referring to Figure 1, there is shown a semi-cylindrical laminate 20 of layers of continuous, non-woven, lineally-aligned, glass filaments, the filaments in each layer being contiguous and surrounded and exclusively bonded to each other and to the filaments of adjacent layers by a plastic composition. The filaments of the inner layer 21 of laminate 20 extend perpendicularly to its circumferential direction. The layer 21 has a thickness of about 0.024 inch. The filaments of each of the other eight layers of laminate 20 are bonded together by the same plastic and are disposed at angles of about 60–65 degrees to those of layer 21 and oppositely to the filaments of adjacent layers. Each of these layers is approximately 0.012 inch in thickness. Accordingly, the total thickness of the laminate 20 is about 0.120 inch. In production, layers of plastic-filled glass filaments are laid up on a cylindrical mandrel, either continuously or in long sections, to provide a tubular laminate from which is cut the individual laminate 20.

Upset molded male threads may be provided for a plastic pipe using a pair of semi-cylindrical laminates 20 as illustrated in Figure 1 through the medium of a pair of internally-threaded metal die halves 31 and 32 shown in Figure 2, each of which die halves 31 and 32 are provided in a specific embodiment with 2⅜ inch API standard drill pipe thread. A laminate 20 is laid in its natural contour against the threads of die half 31, and a steel ram having a cylindrical leading edge 1.75 inches diameter and faced with an additional 0.25 inch layer of vulcanized natural rubber of hardness comparable to a pencil eraser is brought against the laminate 20 with its axis parallel to the axis of the die threads. Because of the taper of the die threads, the rubber face of the ram initially contacts the die threads at one end of the die; and because the diameter of the rubber-faced ram essentially equals the diameter of the semi-cylinder formed by the exposed surface of the laminate 20, contact is made almost simultaneously along the full length of the first thread. As the ram moves against the die, the laminate 20 is pressed into the profile of the die threads progressively from one end of the die to the other, and as the ram is pressed squarely against the die, its rubber facing is forced outwardly to seat the laminate along the full length of the threads. In a specific case, a pressure is built up quickly in the order of 3500 pounds per square inch and released, the ram being in contact with the laminate for no more than three seconds.

The die halves 31 and 32 are also adapted to form a wrench ring or retaining collar 30, the material for a large number of which may be conveniently prepared in a single operation using a cylindrical mandrel. By this operation, strips of lineally-aligned glass filaments pre-saturated with a plastic composition are wound helically in layers with the filaments of each layer disposed oppositely with respect to filaments of adjacent layers. The resulting roll is then removed from the mandrel and sliced into rings of a desired thickness, one of which rings is slipped into position on a pipe 10 as shown in Figure 2 to provide material for a wrench ring 30.

With the material for wrench ring 30 in position on pipe 10 and each of the die halves 31 and 32 filled with a laminate 20 as described above, the die halves are placed in position around the pipe 10 as illustrated schematically in Figure 2 and closed in a pre-heated platen press (not shown). Because of the taper of the die threads, the platen press progressively applies pressure to the laminate 20, first at their leading edges 20a and 20b and successively toward wrench ring material 30. Accordingly, an undue pressure buildup at any point is averted by the flow of the plastic in laminates 20 toward and into the wrench ring material, the flow being assisted by heat transmitted from the platens. Excess plastic is forced beyond the wrench ring out along the surface of the pipe 10. After the plastic is hardened, the die halves 31 and 32 are removed and any excess material such as at the edges 20a and 20b and along the flash line of the die may be cut off.

In a specific application, the plastic material in the laminates 20 and wrench ring material 30 may be hardenable with heat to a substantially infusible, insoluble state, which heat may be supplied by the heated platen press. If the same material is present in the pipe 10 in an uncured state, the whole may be placed in an oven for a time sufficient to cure the material of both the pipe and its threads and wrench ring.

Referring now to Figure 3, there is shown a fragment of an externally threaded die 40 useful in forming female threads for a plastic pipe member, which die in a specific embodiment is provided with 2⅜ inch API standard drill pipe thread. A layer of continuous, non-woven, lineally-aligned glass filaments, the filaments being contiguous and surrounded and exclusively bonded to each other by a plastic composition, is laid against the die 40 to provide a continuous layer 42 around the die, about 0.012 inch in thickness. In Figure 3, the layer 42 is represented for convenience by single separated strands 43, but in reality consists of a large number of closely packed filaments built up to a thickness many times the diameter of an individual filament. Starting at one end of the die 40, a yarn 44 of a large number of glass filaments, specifically 150 3/2 yarn produced by Owens-Corning Fiberglas, is wound under tension spirally around the die at the same pitch as the threads of the die, drawing the layer 42 tightly into the profile of the die threads.

A second layer of plastic-filled lineally-aligned glass filaments (not shown) identical to layer 42 is then placed over the layer 42 with its filaments disposed in the same direction as those of layer 42, and this layer is drawn into the profile of the die threads in the same manner. By this procedure, the die threads are completely filled to provide an essentially smooth, but tapered outer surface.

Referring to Figure 4, plastic-impregnated mat of relatively short, randomly oriented and intermingled glass filaments, viz., "Owens-Corning Surfacing Mat, treatment #4," is wrapped over the preceding layers and is shaped by pressure rollers (not shown) to provide glass-reinforced mass 45 with a cylindrical surface. The rollers also function to squeeze out entrapped air and excess resin.

Over reinforced mass 45 are wound convolutely eight plies of plastic-impregnated glass cloth 46, viz., Hess Goldsmith #163 Volan finish cloth, after which the pressure rolls again drive out excess resin and entrapped air. Finally, a surface layer 47 is formed from plastic-impregnated glass mat, specifically the same mat used to build mass 45, by winding the mat convolutely for two revolutions after which the pressure rolls are again applied to yield a smooth decorative surface. After the plastic is hardened, the die 40 may be removed by screwing out each half, the die 40 being split centrally as indicated by line 48.

Referring now to Figure 5, the female coupling 41 illustrated in Figure 4 may function to couple the threaded pipe 10 of Figure 2 with an identically threaded pipe 10a. The connection may be made extremely tight, in that pipe wrenches and strap wrenches can be applied to both the coupling 41 and the wrench rings 30 and 30a.

In a specific, preferred embodiment, the plastic material in the threads consisted of a mixture of 30 parts plastisol grade polyvinyl chloride, viz., "Geon 121," 15 parts by weight of meta-phenylene diamine, and 100 parts epoxy resin ("Epon 828," a product of the Shell Chemical Corporation and believed to be the reaction product of epichlorhydrin and bisphenol) having a melting point of about 8–12° C. as determined by the Durrans' Mercury Method and an epoxide equivalent weight of 190–210. In using this resin composition, the threaded pipe members were placed in an air-circulating oven at 350° F. for about 1.5 hours to cure the resin of the threads to a substantially infusible, insoluble state.

Threads thus prepared were tested by coupling together male and female threaded pipe members and subjecting them to steady axial tension. The threads withstood a tension of more than 32,000 pounds, the test being terminated by delamination of the body of the pipe member to which the male threads were adhered.

When used to carry fluids at high internal pressures, the connection was found to be completely impervious. In a specific test, sections of pipe were coupled as illustrated in Figure 5 and connected into pressurized water-carrying lines by means of their threads. The specimens were immersed in water heated to 150° F., and the pressure in the lines was varied between 250 and 1000 pounds per square inch at the rate of 34 cycles per minute. The pipe and coupling were examined periodically for evidence of leakage. In numerous tests, leakage was never detected at the connection between the pipes since in every case the pipe failed before the coupling, even though some pipes withstood as many as 800,000 cycles. For many tests the female couplings were reused a number of times, but in no case was there any evidence of deterioration.

The reinforced plastic pipe used in the tests required for impermeability a liner 16 as indicated in Figure 5, but the female coupling 41 functioned satisfactorily in the tests without lining, although a lining might be desirable in certain applications to improve impermeability or to protect the materials in the coupling from the action of fluids carried by the pipe system. The female coupling 41 also served to constrict the male threads of pipes 10 and 10a from expansion and thereby prevented the segments of the screw threads from being forced apart. Cooperating in this respect are wrench rings 30 and 30a to prevent the portion of the segments not covered by the coupling 41 from separating.

To test the connection under actual operating conditions, portions of a large number of existing fluid-handling pipe installations have been replaced by lengths of reinforced resinous pipe threaded and coupled as described above. In no case has failure in the pipe connection been observed. One installation carried sweet crude oil at the rate of 350 barrels per day under a wellhead pressure fluctuating between 0 and 250 pounds per square inch at 20 strokes per minute. The installation was also subjected to substantial mechanical vibration. After more than 6,000,000 cycles over a period of more than seven months, the test was discontinued. No evidence of damage was noted in the pipe connection.

In another installation, salt water was conveyed at the rate of 100 barrels per day under a pressure of 1100 pounds per square inch. No evidence of damage was noted after service of more than ten months.

A third installation was used to carry sweet crude oil where paraffin build-up was a particular problem. The coupling successfully withstood hot oiling at 175° F. for several hours to remove paraffin and showed no evidence of wear after more than a year of service.

The resinous material has been burned away from the screw threads in both the female coupling and the pipe. In each case it was found that the filaments were uniformly distributed throughout the cross-section of the helical rib. There was no evidence that any filaments were sheared in the fabrication procedure.

A number of modifications in the coupling devices of this invention and methods of their fabrication will occur to those skilled in the art. For example, the wrench ring 30 illustrated in Figure 2 may utilize other reinforcing material such as glass mat or woven fabric as may other methods be used in its fabrication. Such other methods may include compression molding of other fibrous-reinforced plastics. Other plastic materials are equally applicable including a wide range of thermosetting and thermoplastic materials but should be selected for resistance to temperatures and elements with which contact may be made in an envisioned installation. Neither is it necessary to build the pipe member upon female threads, it being within the ability of one skilled in the art to adhere the threads to the interior of a finished pipe in light of the teachings of this invention.

What I claim is:

1. The method of fabricating reinforced plastic male screw threads for a plastic pipe member from flat compact layers of continuous non-woven lineally-aligned filaments filled with plastic material and using an internally threaded split die, consisting essentially of the steps of laying at least two of said plastic-filled layers, with the filaments of each layer disposed at substantial angles to the filaments of an adjacent layer, across the surface of each portion of said split die; forcing the plastic-filled layers into the profile of the die threads progressively from one end of each die section to the other under a pressure sufficient to cause the plastic-filled layer to flow; adhering the exposed surfaces of the plastic-filled layers to said plastic pipe member; hardening the plastic; and removing the die.

2. The method of fabricating an externally threaded reinforced plastic pipe member using flat compact layers of continuous, non-woven, lineally-aligned filaments filled with plastic material and using an internally threaded split die, consisting essentially of the steps of forming a fiber-reinforced plastic annulus, the internal diameter of which approximates the external diameter of the pipe member; sliding the annulus over said pipe member; laying at least two of said plastic-filled layers, with the filaments of each layer disposed at substantial angles to the filaments of an adjacent layer, across the surface of each portion of said split die; forcing the plastic-filled layers into the profile of the die threads progressively from one end of each die half to the other under a pressure sufficient to cause the plastic-filled layer to flow; placing the filled die halves over said annulus and around said pipe member such that the said plastic-filled layer contacts the annulus and the pipe member; hardening the plastic; and removing the die.

References Cited in the file of this patent

UNITED STATES PATENTS

| | | |
|---|---|---|
| 1,370,024 | Kempton | Mar. 1, 1921 |
| 2,498,831 | Veitch | Feb. 28, 1950 |
| 2,699,415 | Nactmann | Jan. 11, 1955 |
| 2,706,497 | Shobert | Apr. 19, 1955 |
| 2,749,266 | Eldred | June 5, 1956 |
| 2,751,237 | Conley | June 19, 1956 |
| 2,755,110 | Jacobs | July 17, 1956 |